(12) United States Patent
Urbach et al.

(10) Patent No.: US 6,288,383 B1
(45) Date of Patent: Sep. 11, 2001

(54) LASER SPOT LOCATING DEVICE AND SYSTEM

(75) Inventors: Israel Urbach, Haifa; Thomas Langer, Kfar Vradim, both of (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 0 days.

(21) Appl. No.: 09/425,232

(22) Filed: Oct. 25, 1999

(51) Int. Cl.$^7$ .................................................. G02B 7/04
(52) U.S. Cl. ............................... 250/201.5; 369/44.13
(58) Field of Search ........................... 250/201.5, 203.2, 250/208.1, 216; 369/44.13, 44.14, 44.23

(56) References Cited

U.S. PATENT DOCUMENTS 4,561,081 * 12/1985 Janssen et al. ..................... 369/45

* cited by examiner

*Primary Examiner*—Que T. Le
(74) *Attorney, Agent, or Firm*—Mark M. Friedman

(57) ABSTRACT

A daylight operable, scan-free, laser spot locating device for locating a laser spot pointed at an object. The device includes (a) a laser spot detecting system including at least one laser spot detecting device and a first electronic system, the laser spot detecting system being for detecting the laser spot in its field of view; (b) a laser spot locating system including a charge transfer device, the charge transfer device featuring an array of radiation-sensitive elements and including snapshot and internal shutter functions, the laser spot locating system further including a second electronic system, the laser spot locating system being for locating the laser spot in its field of view; (c) an optical arrangement for simultaneously providing the laser spot detecting system and the laser spot locating system with substantially overlapping or substantially identical first and second frames, respectively; and (d) a communication medium for communicating between the first and second electronic systems, such that when the laser spot detecting system detects the laser spot in its field of view, the laser spot locating system is activated to locate the laser spot in terms of a deviation of the laser spot from a predefined location in its field of view.

21 Claims, 8 Drawing Sheets

LASER SPOT LOCATING DEVICE AND SYSTEM

FIELD AND BACKGROUND OF THE INVENTION

The present invention relates to a laser spot locating device and to a laser spot locating system including same. More particularly, the present invention relates to a scan-free, daylight operative, laser spot locating device and further to a system including same along with a laser designator.

Accurate location of a low frequency pulsed laser spot in a large field of view is typically effected by a four quadrant detectors device which further includes gimbals and a servo loop used to scan the four quadrant detectors of the device until the laser spot is located in the center of the field of view of the device.

This gimbals and servo loop based device demands a long chain of laser pulses for location, due to the gimbals and servo loop, it is very expensive to manufacture, it is cumbersome, and above all, it is relatively slow in locating laser spots, e.g., about 10 seconds per location.

In order to simplify the device by elimination of the gimbals and servo loop, defocusing of the spot to about a quarter of the field of view is employed. The position of the spot is thereafter determined by the ratio of the defocused spot on each quadrant detector, thereby obviating the need for the gimbals and the servo loop. However, due to defocusing, the accuracy of such a device is very low.

Charge transfer devices (CCDs, CIDs or active pixel devices), which also obviate the need for gimbals and servo loop due to their inherent array of radiation-sensitive elements, are usable for laser spot location only when employed in combination with strong CW lasers that consume a large amount of power, or with less powerful lasers when there is a very low background radiation, (as at night time or inside a machine). In daylight, however, such devices results in a very poor sensitivity (i.e., low signal-to-noise ratio), rendering such devices inoperative.

There is thus a widely recognized need for, and it would be highly advantageous to have, a daylight operable, scan-free laser spot locating device and system devoid of the above limitations.

SUMMARY OF THE INVENTION

According to one aspect of the present invention there is provided a daylight operable, scan-free, laser spot locating device for locating a laser spot being pointed at an object, the device comprising (a) a laser spot detecting system including at least one laser spot detecting device and a first electronic system, the laser spot detecting system being for detecting the laser spot in its field of view; (b) a laser spot locating system including a charge transfer device, the charge transfer device featuring an array of radiation-sensitive elements and including snapshot and internal shutter functions, the laser spot locating system further including a second electronic system, the laser spot locating system being for locating the laser spot in its field of view; (c) an optical arrangement for simultaneously providing the laser spot detecting system and the laser spot locating system with substantially overlapping or substantially identical first and second frames, respectively; and (d) a communication medium for communicating between the first and second electronic systems, such that when the laser spot detecting system detects the laser spot in its field of view, the laser spot locating system is activated to locate the laser spot in terms of a deviation of the laser spot from a predefined location in its field of view.

According to another aspect of the present invention there is provided a daylight operable laser spot locating system comprising (a) a laser designator for pointing a laser spot at an object; and (b) a daylight operable, scan-free, laser spot locating device for locating the laser spot, the device including (i) a laser spot detecting system including at least one laser spot detecting device and a first electronic system, the laser spot detecting system being for detecting the laser spot in its field of view; (ii) a laser spot locating system including a charge transfer device, the charge transfer device featuring an array of radiation-sensitive elements and including snapshot and internal shutter functions, the laser spot locating system further including a second electronic system, the laser spot locating system being for locating the laser spot in its field of view; (iii) an optical arrangement for simultaneously providing the laser spot detecting system and the laser spot locating system with substantially overlapping or substantially identical first and second frames, respectively; and (vi) a communication medium for communicating between the first and second electronic systems, such that when the laser spot detecting system detects the laser spot in its field of view, the laser spot locating system is activated to locate the laser spot in terms of a deviation of the laser spot from a predefined location in its field of view.

According to yet another aspect of the present invention there is provided a method of locating a laser spot pointed at an object, the method comprising the steps of (a) detecting a presence of the laser spot via a laser spot detecting system including at least one laser spot detecting device; and (b) activating a laser spot locating system including a charge transfer device, the charge transfer device featuring an array of radiation-sensitive elements and including snapshot and internal shutter functions, to locate the laser spot by shortening an integration time employed thereby.

According to further features in preferred embodiments of the invention described below, the optical arrangement includes at least one focusing lens.

According to still further features in the described preferred embodiments the optical arrangement includes at least one focusing lens.

According to still further features in the described preferred embodiments the optical arrangement includes at least one filter for filtering out radiation outside a spectral region of the laser spot.

According to still further features in the described preferred embodiments the laser spot locating system has a first operation mode characterized in constant dumping of signal and a second operation mode characterized in moving the signals to an output shift register, whereas the laser spot locating system is activated to locate the laser spot in terms of the deviation of the laser spot from the predefined location in its field of view by switching from the first mode of operation to the second mode of operation.

According to still further features in the described preferred embodiments the short integration time is in a range of a duration of a single laser pulse generated by the laser designator.

According to still further features in the described preferred embodiments the short integration time is in a range of about 20–100 microseconds.

According to still further features in the described preferred embodiments the predefined location is a center.

According to still further features in the described preferred embodiments the laser spot detecting device includes a solid state laser detector.

According to still further features in the described preferred embodiments the solid state laser detector is of a material matching the wavelength of the laser, e.g., silicon, gallium arsenide, etc.

According to still further features in the described preferred embodiments the charge transfer device is selected from the group consisting of CCD, CID and an active pixel device.

The present invention successfully addresses the shortcomings of the presently known configurations by providing a daylight operable, scan-free, laser spot locating device and system characterized by high signal-to-noise ratio even under daylight background illumination, which device is based on pixels detection and therefore obviates the need for gimbals and servo loop, and which operates much faster as compared with prior art devices with similar performances (i.e., gimbals including devices).

BRIEF DESCRIPTION OF THE DRAWINGS

The invention herein described, by way of example only, with reference to the accompanying drawings, wherein.

DESCRIPTION OF THE PREFERRED EMBODIMENTS

Figure 1:
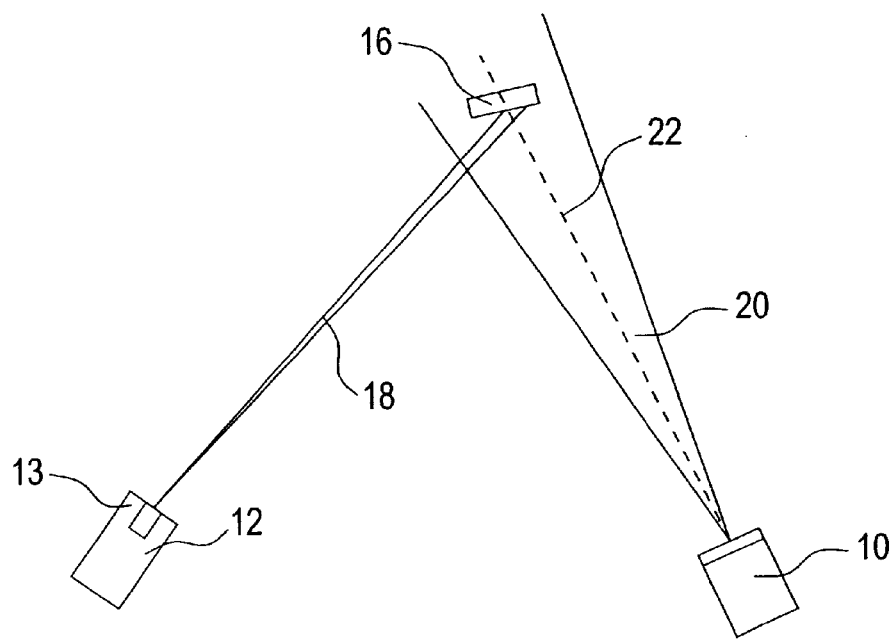
FIG. 1 presents the basic concept of a daylight operable laser spot locating system including a laser designator and a daylight operable laser spot locating device in accordance with the teachings of the present invention.

The present invention is of a laser spot locating device which can de used to locate a laser spot pointed at an object by a laser designator. Specifically, the present invention provides a daylight operable, scan-free, laser spot locating device characterized by high signal-to-noise ratio even under daylight illumination although it employs a charge transfer device array for localization of a laser spot in its field of view.

The principles and operation of a laser spot locating device according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1, which is drawn out of scale and out of internal proportions, illustrates the general concept of a daylight operable laser spot locating device according to the present invention, which is referred to hereinbelow as device 10.

A laser designator 12 which includes a pulsed laser source 13 (e.g., infrared laser source) is designed to point on, or mark, a selected object 16 with a narrow laser beam 18, e.g., of about 0.25 to 1.5 mrad, preferably of about 1 mrad.

Device 10, in turn is designed to locate the spot generated by designator 12, under daylight background illumination, and without scanning action. It therefore employs an array of radiation-sensitive elements, such as a CCD device, and has a wide field of view, as indicated by 20, e.g., of tens of degrees, for example, about 20° or more.

Thus, device 10 is designed to find the coordinates (or angle deviation) of object 16 relative to a center 22 of field of view 20 of detector 15. Hence, device 10 according to the present invention has to be sensitive at the laser-operating wavelength of designator 12.

Figure 2:
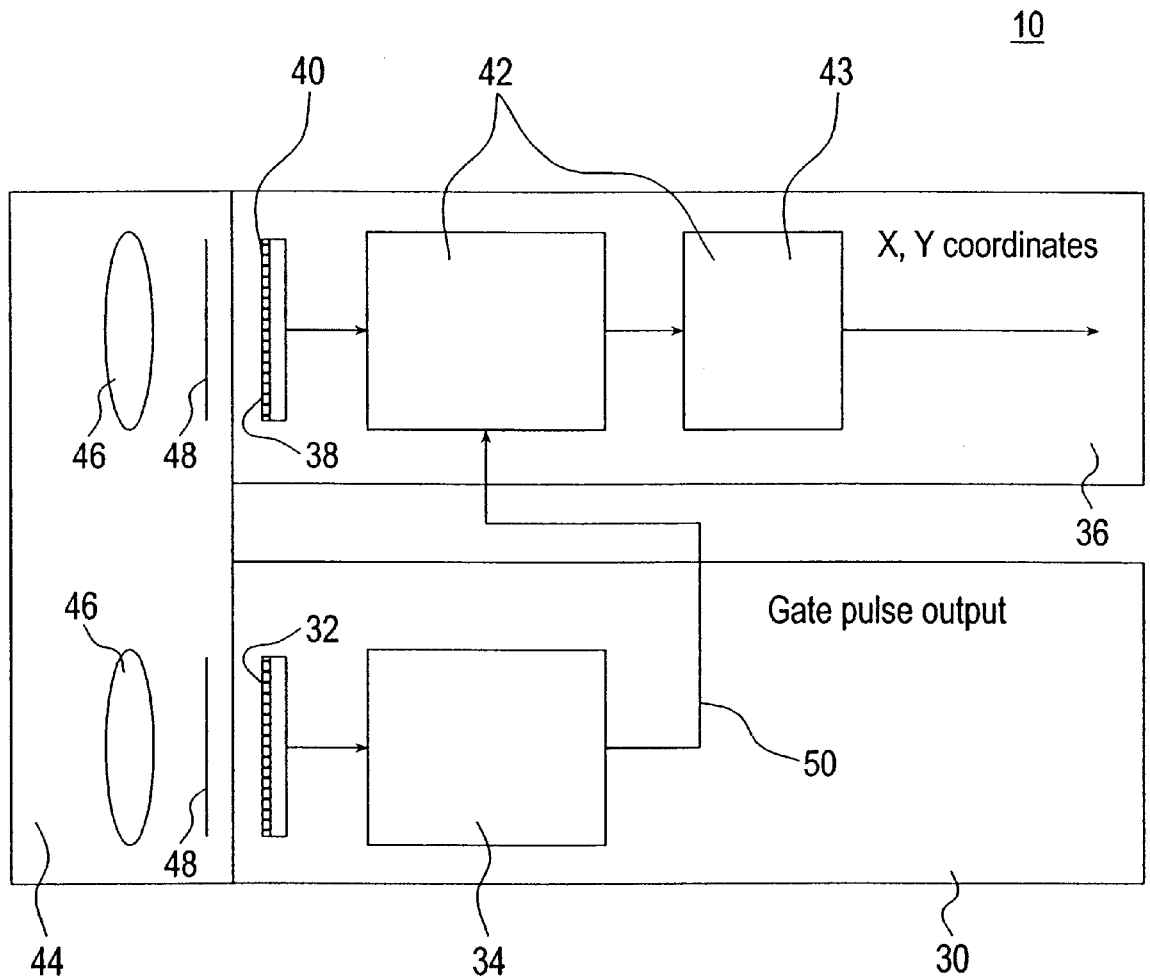
FIG. 2 presents a construction of the daylight operable laser spot locating device according to the present invention.

FIG. 2 presents the construction of device 10 according to the present invention. Thus, device 10 which, as already mentioned, is a daylight operable, scan-free, laser spot locating device and is used for locating a laser spot being pointed at an object includes a laser spot detecting system 30. System 30 includes at least one laser spot detecting device 32 and a first electronic system 34. Laser spot detecting system 30 serves for detecting a laser spot in its field of view.

As used herein in the specification and in the claims section below, the term "daylight operable" refers to an ability to operate under daylight background illumination where the signal-to-noise ratio is inherently low. Yet, as will be appreciated by one ordinarily skilled in the art, as the signal-to-noise ratio is inherently much higher at night, a daylight operable device is much readily operable at night. Thus, the scope of the present invention is directed at a daylight operable device, which is even more efficiently operable at night.

As used herein in the specification and in the claims section below, the term "detect" and its various forms refer to discover or notice the existence or presence of a laser spot.

According to a preferred embodiment of the present invention laser spot detecting device 32 includes a solid state laser detector made of a material matching the wavelength of the laser, e.g., silicon, gallium arsenide, etc. Typically a silicon made detector is employed, e.g., a single silicon pin diode detector, and in this aspect, it is similar to the prior art four quadrant detector system described in the Background section above, yet it does not include gimbals and a servo loop because it serves, according to the present invention, only for detection as opposed to location. Suitable solid state laser detectors are available from E.G. & G., 22001 Dumberry Road, Vaudrevil, Quebec J7V8P7, Canada; T.O.I., 714 Shepherd Drive, Garland, Tex. 75042; U.D.T.—Advanced Photon, 1240 Avenida Acaso, Camarilo, Calif. 93012; and Centronics, King Henry's Drive, Croyday, CR90BG, England.

As used herein in the specification and in the claims section below, the term "locate" and its various forms refer to identifying or discovering the place, orientation or location of a laser spot, to establish in a position or locality of a laser spot, or to assign or ascribe a particular location to a laser spot.

Device 10 further includes a laser spot locating system 36. System 36 includes a charge transfer device 38, featuring an array of radiation-sensitive elements 40, such as, but not limited to, CCD, CID and an active pixel device. Specifically, for reasons further detailed hereinunder, device 38 is selected to include snapshot and internal shutter functions, which serve for controlling integration time. Laser spot locating system 36 further includes an electronic system 42 and serves for locating the laser spot in its field of view as further detailed hereinunder. Suitable charge transfer devices are available from Texas Instrument, SONY and DALSA.

Device 10 further includes an optical arrangement 44. Optical arrangement 44 serves for simultaneously providing laser spot detecting system 30 and laser spot locating system 36 with the laser spot energy and the laser spot location system with overlapping or substantially identical first and second frames, respectively.

As well known in the art, optical arrangement 44 can include at least one lens, preferably two focusing lenses 46, each associated with one of systems 30 and 36, respectively. It can further include a beam splitter, reflectors, etc.

Optical arrangement 44 according to the present invention preferably further includes at least one filter 48, two are shown, each associated with one of systems 30 and 36. Filters 48 serve for filtering-out wavelengths outside the spectral range of the laser employed (typically an infrared laser, e.g., 1064 nm).

Device 10 further includes a communication medium, indicated by arrow 50. Medium 50 serves for communicating between first 34 and second 42 electronic systems, such that when laser spot detecting system 30 detects a laser spot in its field of view, laser spot locating system is activated to locate the laser spot in terms of a deviation of the laser spot from a predefined location in its field of view, preferably a center of its field of view.

According to a preferred embodiment of the present invention electronic systems 34 and 42 are integrated into a single electronic system, such that communication therebetween in effected in the nanoseconds range or less.

As further detailed hereinunder and according to a preferred embodiment of the present invention, laser spot locating system 36 has a first operation mode characterized in constant dumping of signal and a second operation mode characterized in moving the signals to an output shift register.

Laser spot locating system 36 is activated (triggered, prompted) to locate a laser spot in terms of deviation of the laser spot from predefined location in its field of view by switching from the first mode of operation (sensor reset) to the second mode of operation (charge transfer). Preferably, the charge transfer time is in a range of a duration of a single laser pulse, e.g., about 20–100 microseconds.

Thus, by the above described activation, system 36 becomes sensitized to sensing and thereby locating a laser spot only when a laser spot is present and only for a short duration around its presence, so as to reduce integration of background illumination to a minimum and thereby to tremendously increase the sensitivity (signal-to-noise ratio) because where system 36 performs long integration, the signal-to-noise ratio, especially under daylight background illumination, is too low for sensation.

Figure 3:
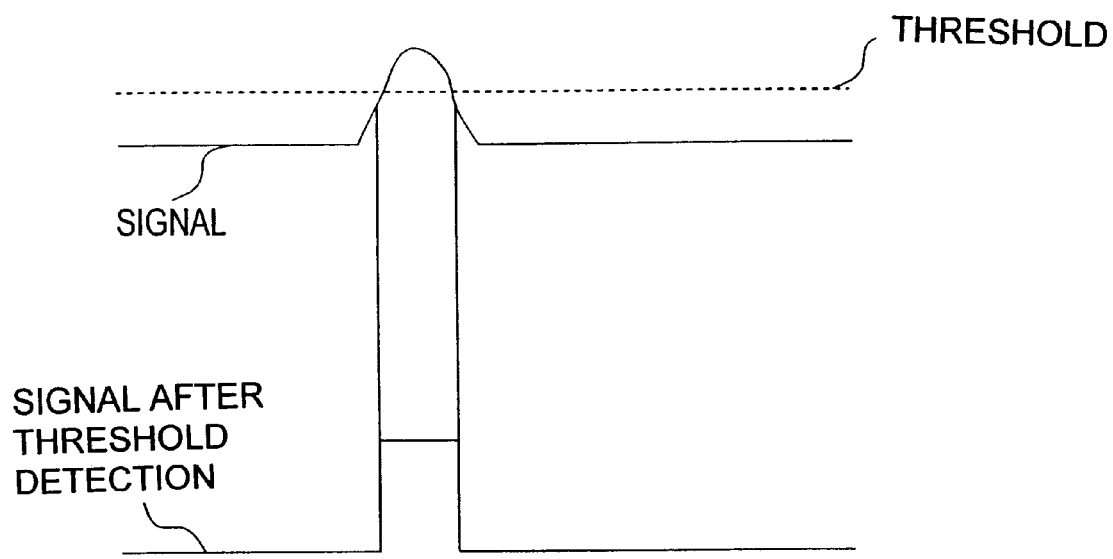
FIG. 3 presents an image of a laser spot as retrieved by a laser spot locating system implemented in the daylight operable laser spot locating device according to the present invention.

FIG. 3 demonstrates a presentation of an image of a laser spot as retrieved by system 36. The spot typically occupies several pixels (a number of which depends on the number of pixels in the array, the field of view and the angle of the laser designator with respect to the object and of the object with respect to device 10). Since background illumination is almost eliminated by the short and precisely timed integration time employed, the laser pulse signal generated in system 36 is above noise level and it is therefore easily sensed by a threshold circuit. The short integration time (for example 20 microseconds instead of 16.6 msec integration time usually employed in the above-indicated CCDs) practically reduces the accumulation of background information almost to zero (e.g., by a factor of about 830 in the mentioned case). Even for very high background contrasts, the method of frames subtraction separates the laser signal from the background.

Figure 4:
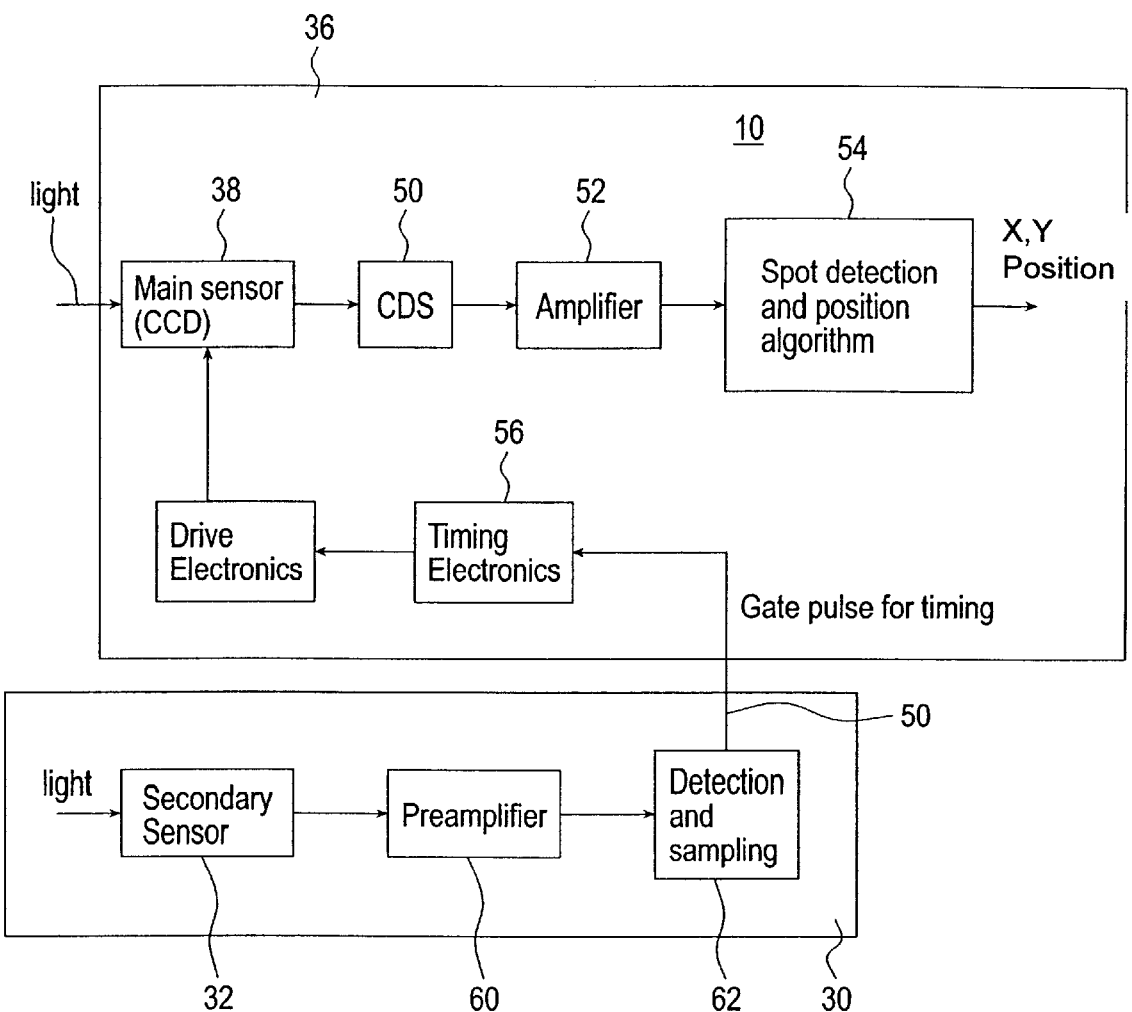
FIG. 4 presents a block diagram of the daylight operable laser spot locating device according to the present invention.

FIG. 4 presents a block diagram of device 10 according to the present invention. The signal (video) output of device 38 of system 36 is preferably processed using a correlated double sampling circuit (CDS) 50, which is known in the art to result in improved signal-to-noise ratio.

The signal is then amplified via a signal amplifier 52 to enable digitization and further processing via a spot position detection algorithm, indicated by box 54 and further detailed hereinunder.

It will be appreciated that circuit 50, amplifier 52 and algorithm 54 are all components of what is referred to hereinabove as electronic system, forming the analyzing part thereof, indicated in FIG. 3 by box 43.

Both the timing 56 and the drive 58 electronics of device 10 are controlled by an activation (trigger) signal (gate pulse) 50 generated by system 30 when laser spot detecting device 32 thereof detects a laser spot in its field of view.

The current output of device 32 if processed in a preamplifier and filter analog circuits 60 to establish the occurrence of laser pulse recognition, as indicated by box 62.

Thus, device 10 ensures that the short laser pulse is amplified and easily located, since there is, in effect, no integration of background information. The delay between the activation and the laser pulse input is of several nanoseconds only and therefore does not influence the operation of device 10.

Figure 5:
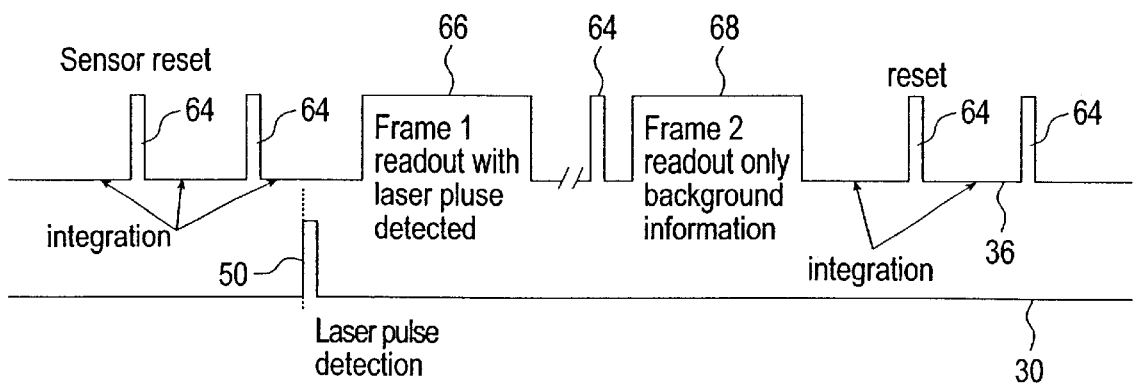
FIG. 5 presents a principle adopted for the operation of the daylight operable laser spot locating device according to the present invention.

FIG. 5 demonstrates a principle adopted for the operation of device 10 according to the present invention. A mode in which system 36 operates depends on the activation (trigger) signal 50 generated by system 30. When such activation is experienced, device 38 operates in its charge transfer and readout mode and is not cleared (reseted) regularly by internal shutter (reset) pulses 64. The reset time is very short, about 1 microsecond, as compared with the integration time, of about 20, 50 or 100 microsecond. As already indicated hereinabove, the laser pulse detected by system 30 activates system 36 to perform its laser pulse readout mode and the frame information which includes the laser pulse is read out, as indicated in FIG. 5 by Frame 1, 66. After this frame is read out, system 36 is enabled to integrate for another short integration time (e.g., 20 microsecond). This frame, 68, which is referred to herein as Frame 2, includes background information only. Frames 1 and 2 are stored and further processed electronically as detailed hereinunder.

Figure 6:
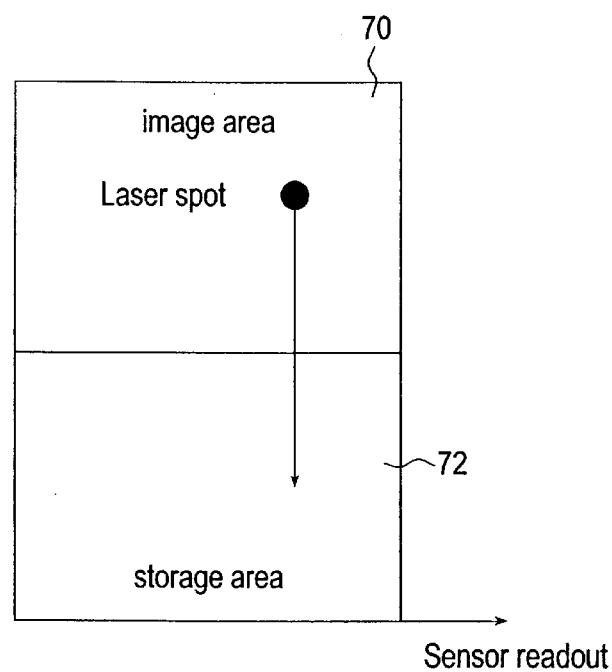
FIGS. 6 and 7 present an implementation of the laser spot locating system implemented in the daylight operable laser spot locating device according to the present invention.
Figure 7:
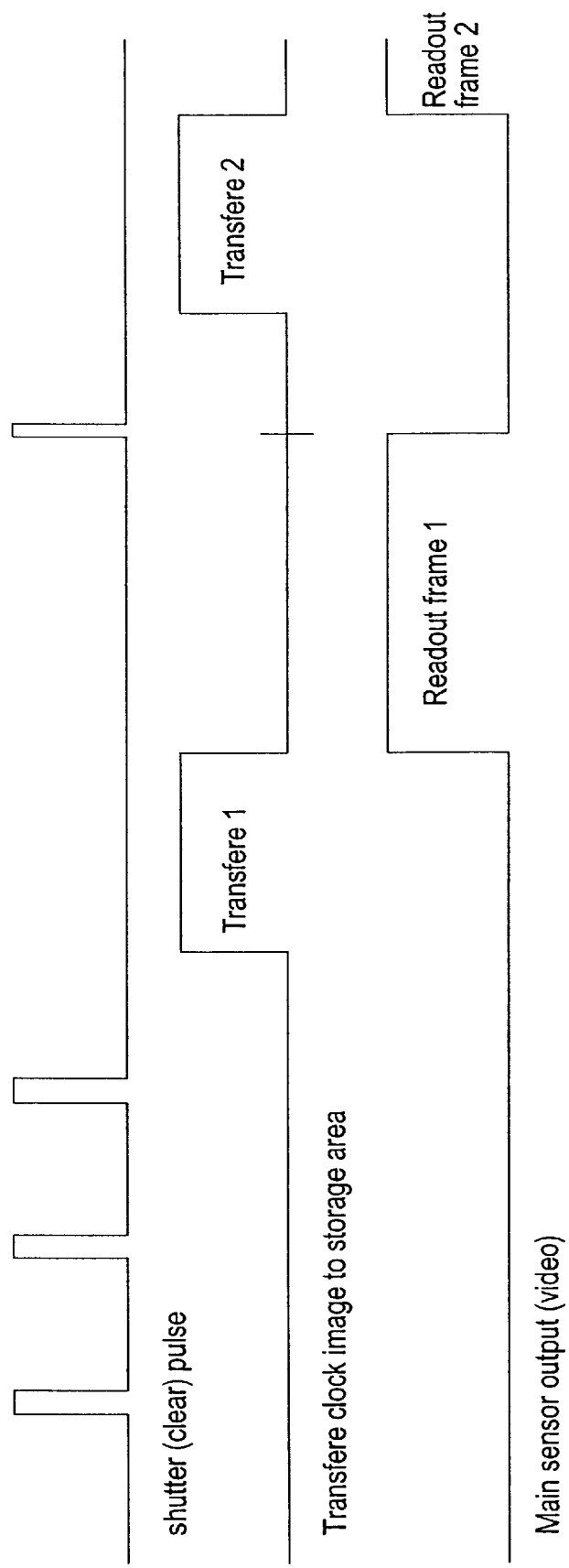

FIGS. 6 and 7 show an implementation of the laser spot locating system according to the present invention when including a CCD device. The image area 70 is integrated and thereafter it is cleared as discussed above. When readout occurs, the accumulated charge is transferred to an optically covered storage area 72. This transfer is fast and prolongs from one to about 10 microseconds. From storage area 72 the frame is read out serially. The readout can be comparatively slow to enable correlated double sampling circuit (CDS) processing so as to obtain high signal-to-noise ratio.

Figure 8:
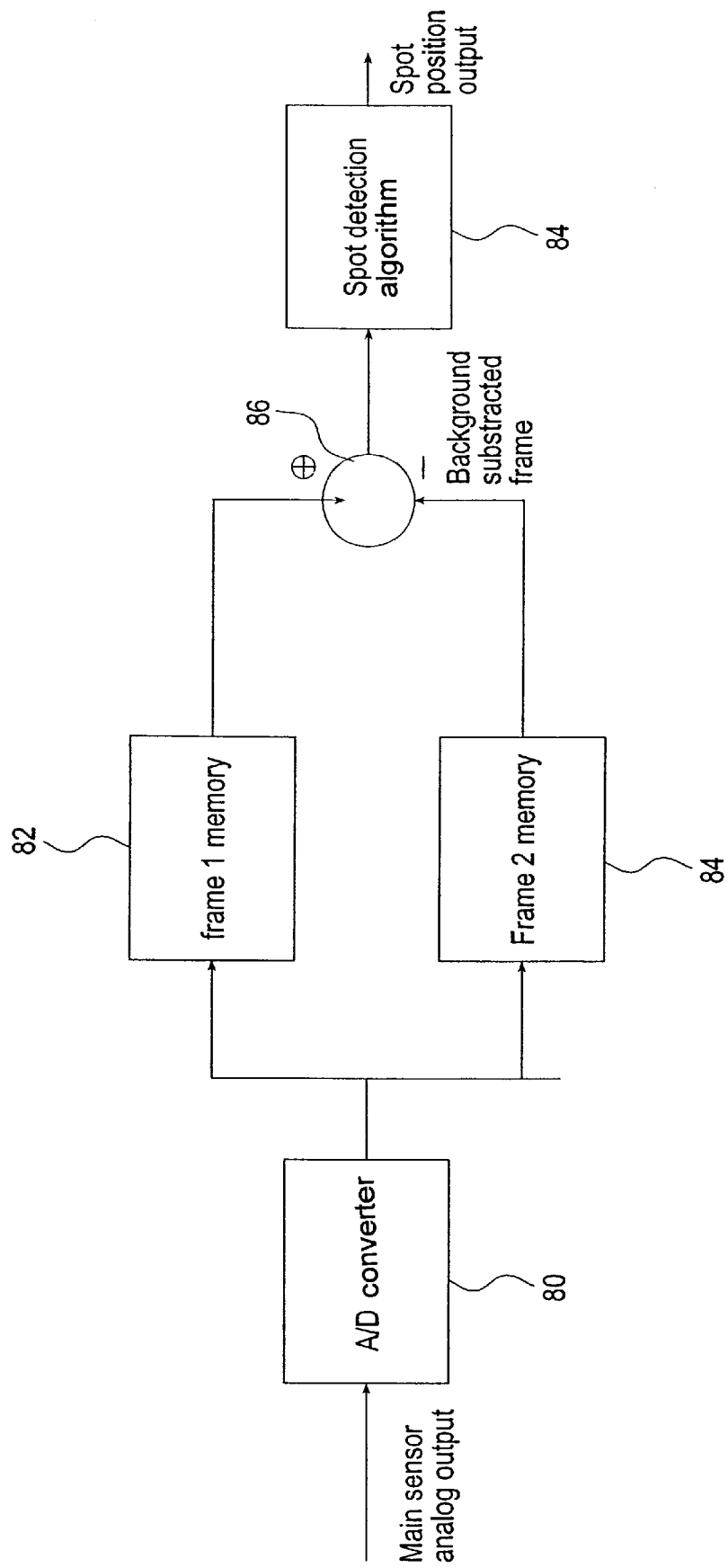
FIG. 8 presents some digital electronic processing involved in the operation of the daylight operable laser spot locating device according to the present invention.

FIG. 8 presents the digital electronic processing involved. An analog-to-digital converter 80 converts the outputs of device 38. As indicated by 82 and 84, respectively, Frame 1 and Frame 2 are stored, and are thereafter subtracted one from the other, as indicated by 86. Doing so, the common background information is subtracted from the signal and only the laser information with non substractable noise information is left for analysis of the spot detection algorithm, as indicated by 88.

Figure 9:
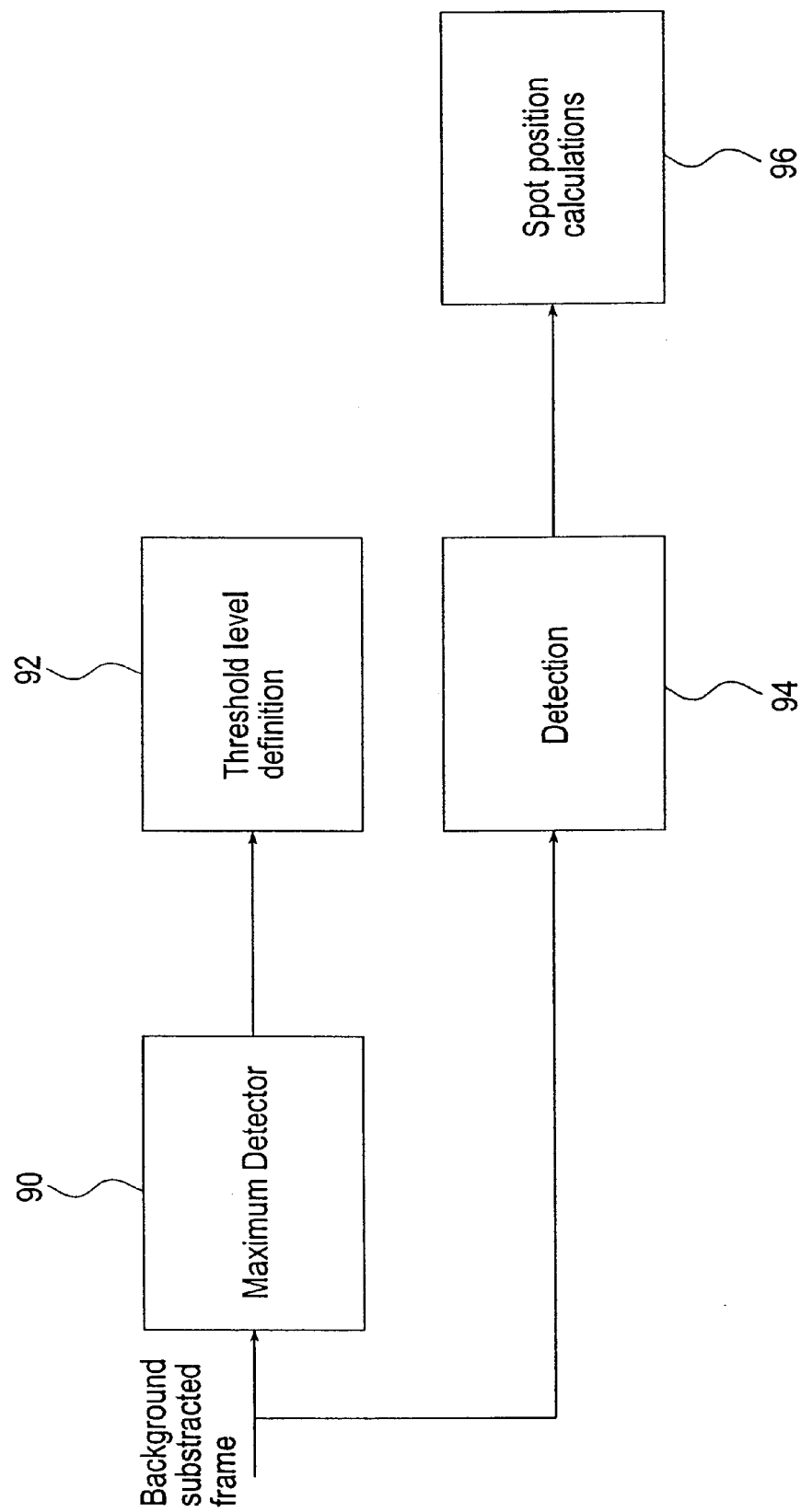
FIG. 9 presents a spot detection algorithm employed in the daylight operable laser spot locating device according to the present invention.

FIG. 9 describes the preferred spot detection algorithm employed. A maximum detector 90 is employed to determine a threshold level 92 and the spot presenting pixels are detected by being pixels passing the threshold level set by 92, as indicated by 94. Since the information is accumulated digitally, the spot position is easily calculated by pixel position, as indicated by 96.

Figure 10:
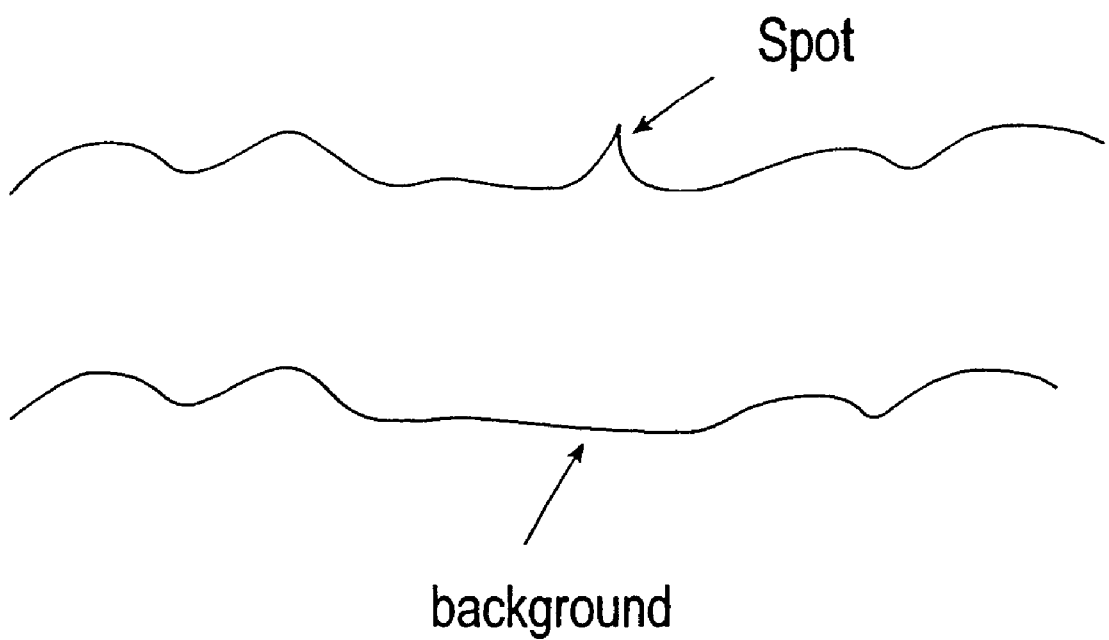
FIG. 10 presents typical spot and background signals as retrieved using the daylight operable laser spot locating device according to the present invention.

FIG. 10 shows typical spot and background signals as retrieved using device 10 according to the present invention.

The device according to the present invention has numerous advantages over the prior art. First it includes a CCD and therefore the need for gimbals and servo loop is obviated, rendering the device cost-effective and simple. Second, it employs activation and short integration times to timely collect laser pulse information with minimum background information, and therefore, as opposed to CCD based devices which operated without activation and integration time control, it is characterized by high sensitivity even under daylight operation. Third, because it is scan-free, it operates very fast and is capable of locating a pulsed laser spot within one second or less.

Further according to the present invention there is provided a method of locating a laser spot pointed at an object. The method is effected by executing the following method steps, wherein in a first step the presence of the laser spot is detected via a laser spot detecting system including at least one laser spot detecting device, whereas in a second step a laser spot locating system, which includes a charge transfer device featuring an array of radiation-sensitive elements and including snapshot and internal shutter functions, is activated to locate the laser spot by shortening an integration time employed thereby.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A daylight operable, scan-free, laser spot locating device for locating a laser spot being pointed at an object, the device comprising:
    (a) a laser spot detecting system including at least one laser spot detecting device and a first electronic system, said laser spot detecting system being for detecting the laser spot in its field of view;
    (b) a laser spot locating system including a charge transfer device, said charge transfer device featuring an array of radiation-sensitive elements and including snapshot and internal shutter functions, said laser spot locating system further including a second electronic system, said laser spot locating system being for locating the laser spot in its field of view;
    (c) an optical arrangement for simultaneously providing said laser spot detecting system and said laser spot locating system with substantially overlapping or substantially identical first and second frames, respectively; and
    (d) a communication medium for communicating between said first and second electronic systems, such that when said laser spot detecting system detects the laser spot in its field of view, said laser spot locating system is activated to locate the laser spot in terms of a deviation of the laser spot from a predefined location in its field of view.

2. The device of claim 1, wherein said optical arrangement includes at least one focusing lens.

3. The device of claim 1, wherein said optical arrangement includes at least one filter for filtering out radiation outside a spectral region of the laser spot.

4. The device of claim 1, wherein said laser spot locating system has a first operation mode characterized in characterized in constant dumping of signal and a second operation mode characterized in moving the signals to an output shift register, whereas said laser spot locating system is activated to locate the laser spot in terms of said deviation of the laser spot from said predefined location in its field of view by switching from said first mode of operation to said second mode of operation.

5. The device of claim 4, wherein said short integration time is in a range of a duration of a single laser pulse.

6. The device of claim 4, wherein said short integration time is in a range of about 20–100 microseconds.

7. The device of claim 1, wherein said predefined location is a center.

8. The device of claim 1, wherein said laser spot detecting device includes a solid state laser detector.

9. The device of claim 8, wherein said solid state laser detector is of a material matching the wavelength of the laser.

10. The device of claim 1, wherein said charge transfer device is selected from the group consisting of CCD, CID and an active pixel device.

11. A daylight operable, scan-free, laser spot locating system comprising:
    (a) a laser designator for pointing a laser spot at an object; and
    (b) a daylight operable laser spot locating device for locating said laser spot, the device including:
        (i) a laser spot detecting system including at least one laser spot detecting device and a first electronic system, said laser spot detecting system being for detecting said laser spot in its field of view;
        (ii) a laser spot locating system including a charge transfer device, said charge transfer device featuring an array of radiation-sensitive elements and including snapshot and internal shutter functions, said laser spot locating system further including a second electronic system, said laser spot locating system being for locating said laser spot in its field of view;
        (iii) an optical arrangement for simultaneously providing said laser spot detecting system and said laser spot locating system with substantially overlapping or substantially identical first and second frames, respectively; and
        (vi) a communication medium for communicating between said first and second electronic systems, such that when said laser spot detecting system detects said laser spot in its field of view, said laser spot locating system is activated to locate said laser spot in terms of a deviation of said laser spot from a predefined location in its field of view.

12. The device of claim 11, wherein said optical arrangement includes at least one focusing lens.

13. The device of claim 11, wherein said optical arrangement includes at least one filter for filtering out radiation outside a spectral region of said laser spot.

14. The device of claim 11, wherein said laser spot locating system has a first operation mode characterized in constant dumping of signal and a second operation mode characterized in moving the signals to an output shift register, whereas said laser spot locating system is activated to locate said laser spot in terms of said deviation of said laser spot from said predefined location in its field of view by switching from said first mode of operation to said second mode of operation.

15. The device of claim 14, wherein said short integration time is in a range of a duration of a single laser pulse generated by said laser designator.

16. The device of claim 14, wherein said short integration time is in a range of about 20–100 microseconds.

17. The device of claim 11, wherein said predefined location is a center.

18. The device of claim 11, wherein said laser spot detecting device includes a solid state laser detector.

19. The device of claim 18, wherein said solid state laser detector is of a material matching the wavelength of the laser.

20. The device of claim 11, wherein said charge transfer device is selected from the group consisting of CCD, CID and an active pixel device.

21. A method of locating a laser spot pointed at an object, the method comprising the steps of:

(a) detecting a presence of the laser spot via a laser spot detecting system including at least one laser spot detecting device; and (b) activating a laser spot locating system including a charge transfer device, said charge transfer device featuring an array of radiation-sensitive elements and including snapshot and internal shutter functions, to locate the laser spot by shortening an integration time employed thereby.

* * * * *